United States Patent
Hall et al.

(10) Patent No.: US 6,742,037 B1
(45) Date of Patent: May 25, 2004

(54) METHOD AND APPARATUS FOR DYNAMIC INFORMATION TRANSFER FROM A MOBILE TARGET TO A FIXED TARGET THAT TRACKS THEIR RELATIVE MOVEMENT AND SYNCHRONIZES DATA BETWEEN THEM

(75) Inventors: Anthony D. Hall, Cary, NC (US); Walden B. Crabtree, Jr., Raleigh, NC (US); Ta-Ming Chen, Cary, NC (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/303,310

(22) Filed: Apr. 30, 1999

Related U.S. Application Data

(60) Provisional application No. 60/110,480, filed on Dec. 1, 1998.

(51) Int. Cl.[7] ............................................... G06F 15/16
(52) U.S. Cl. ........................ 709/228; 709/227; 701/300
(58) Field of Search ................................. 709/106, 202, 709/225, 227, 228, 245; 701/201, 300, 302

(56) References Cited

U.S. PATENT DOCUMENTS

| | | | | |
|---|---|---|---|---|
| 5,493,692 A | * | 2/1996 | Theimer et al. | |
| 5,611,050 A | * | 3/1997 | Theimer et al. | |
| 5,666,530 A | * | 9/1997 | Clark et al. | |
| 5,677,837 A | * | 10/1997 | Reynolds | |
| 5,719,771 A | * | 2/1998 | Buck et al. | |
| 5,796,394 A | * | 8/1998 | Wicks et al. | |
| 5,892,447 A | * | 4/1999 | Wilkinson | |
| 5,906,657 A | * | 5/1999 | Tognazzini | |
| 5,918,158 A | * | 6/1999 | LaPorta et al. | |
| 5,959,543 A | * | 9/1999 | LaPorta et al. | |
| 5,974,238 A | * | 10/1999 | Chase, Jr. | |
| 6,000,000 A | * | 12/1999 | Hawkins et al. | |
| 6,014,090 A | * | 1/2000 | Rosen et al. | |
| 6,052,735 A | * | 4/2000 | Ulrich et al. | |
| 6,073,075 A | * | 6/2000 | Kondou et al. | |
| 6,085,192 A | * | 7/2000 | Mendez et al. | |
| 6,088,648 A | * | 7/2000 | Shah et al. | |
| 6,202,023 B1 | * | 3/2001 | Hancock et al. | ............. 701/201 |
| 6,219,694 B1 | * | 4/2001 | Lazaridis et al. | ........... 709/245 |
| 6,222,482 B1 | * | 4/2001 | Gueziec | |
| 6,266,612 B1 | * | 7/2001 | Dussell et al. | |
| 6,327,535 B1 | * | 12/2001 | Evans et al. | |
| 6,490,613 B1 | * | 12/2002 | Do | ............................. 709/202 |

OTHER PUBLICATIONS

Blackberry, Technical White Paper Version 1.0, Research in Motion, pp. 1–15.*

* cited by examiner

*Primary Examiner*—Le Hien Luu
*Assistant Examiner*—Stephan Willett
(74) *Attorney, Agent, or Firm*—Withrow & Terranova, PLLC

(57) ABSTRACT

A dynamic information transfer system in which there are at least two targets 110 120, one of which is a mobile target 110 and among which information can be transferred. The targets 110 120 possess systems to store, process, and use information and programs in the form of an intelligent software agent (ISA) system 130 associated with each target that is capable of initiating actions and negotiating with other agents or systems in the network. The ISA system 130 includes a personal assistant device (PAD), or the like, that interacts with the user, and performs operations on the user's behalf. A Location Determination System (LDS) 140 is utilized to determine the user's geographic position and the user's direction and speed of travel, if mobile. Virtual zones 150 are used to trigger data transfers among the involved targets, events, or programs to be initiated or terminated at one of the involved targets. Virtual zones 150 are bounded areas encompassing targets that are calculated dynamically from the location, direction, speed, and current or pending user activities associated with all involved targets. A User Profile is created and maintained either manually by the user or automatically by the user's PAD, and which specifies various user preferences related to such things as software programs, communications and messaging, entertainment, scheduling, and the degree of freedom and behavior of the PAD itself.

13 Claims, 10 Drawing Sheets

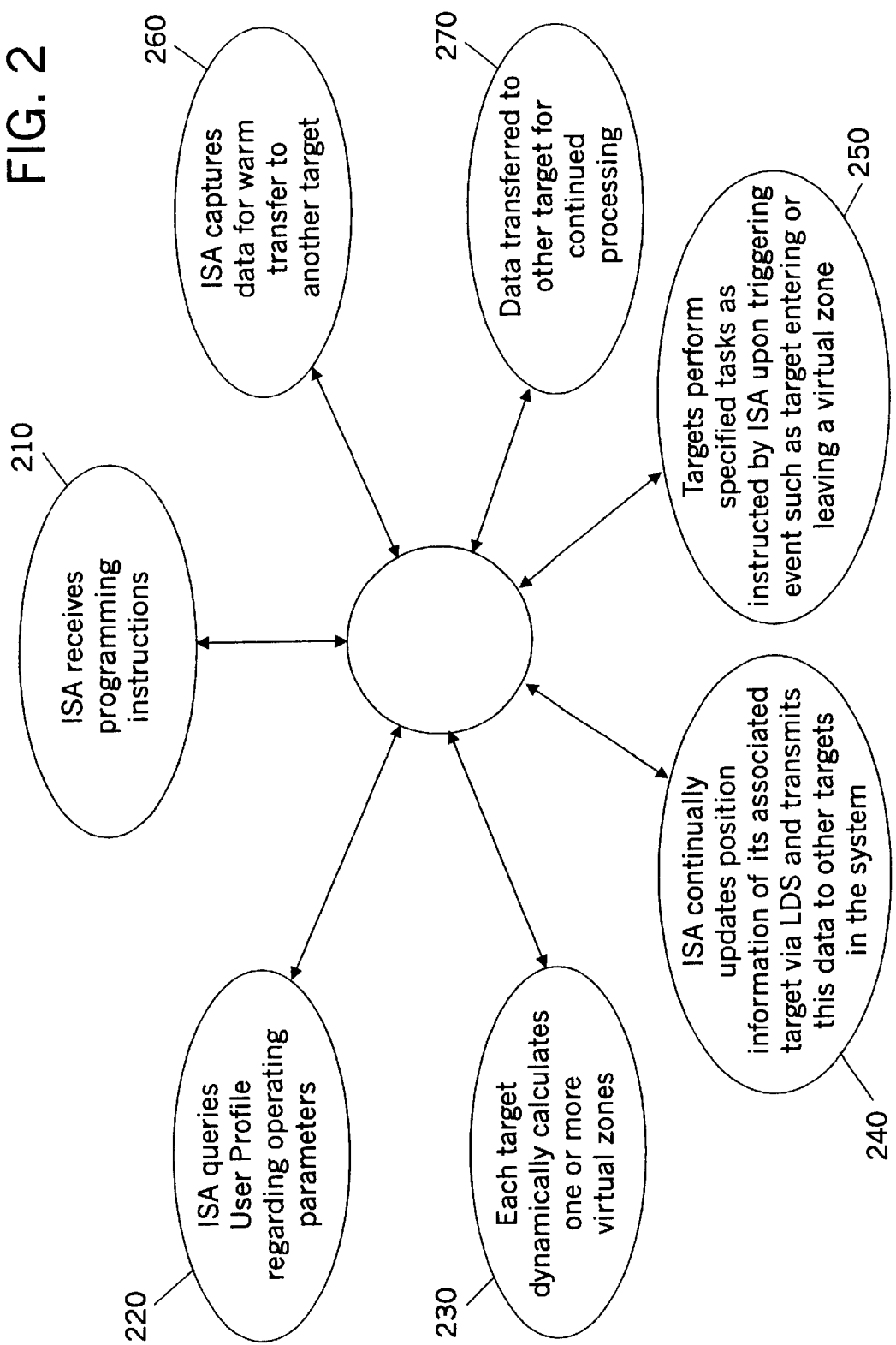

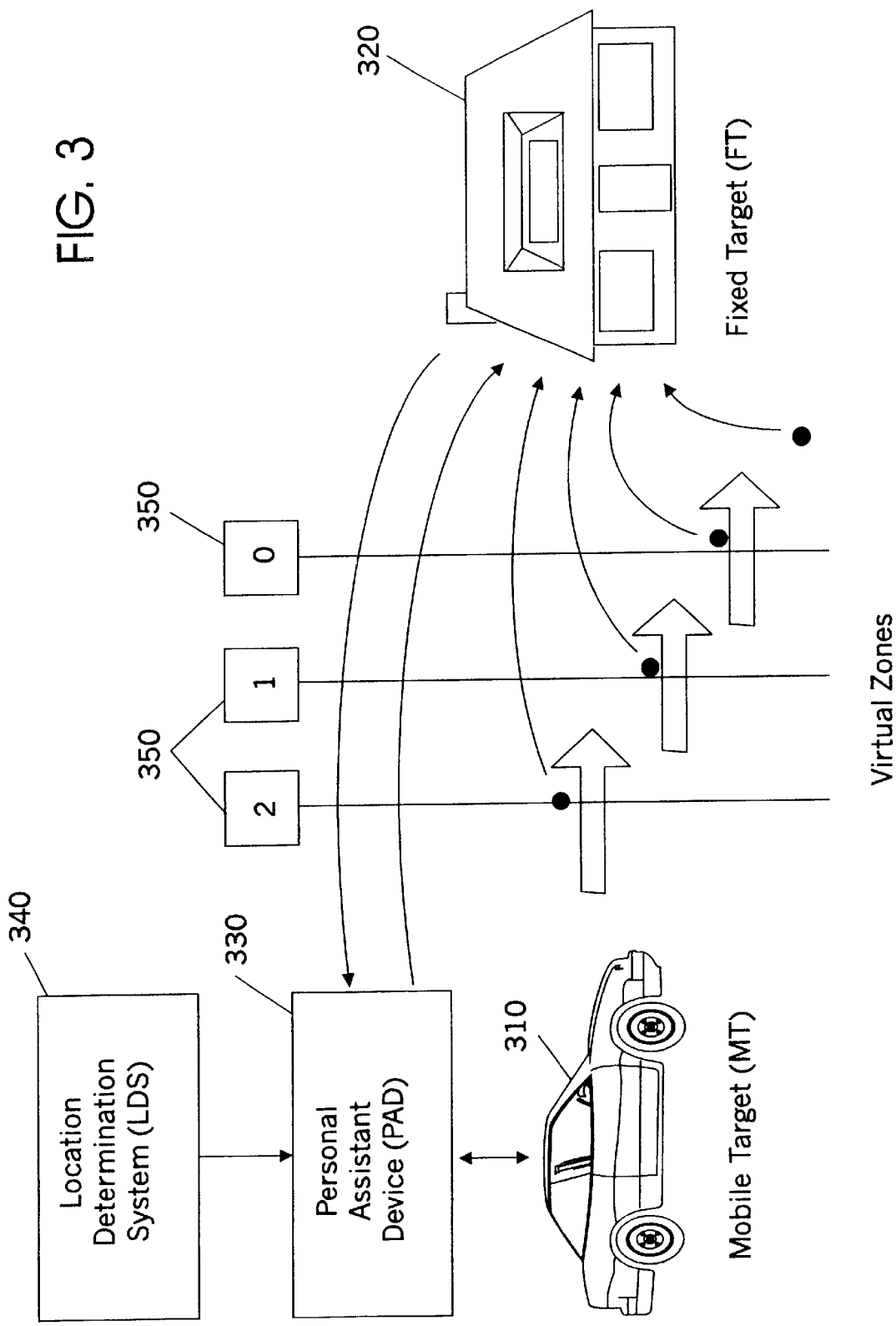

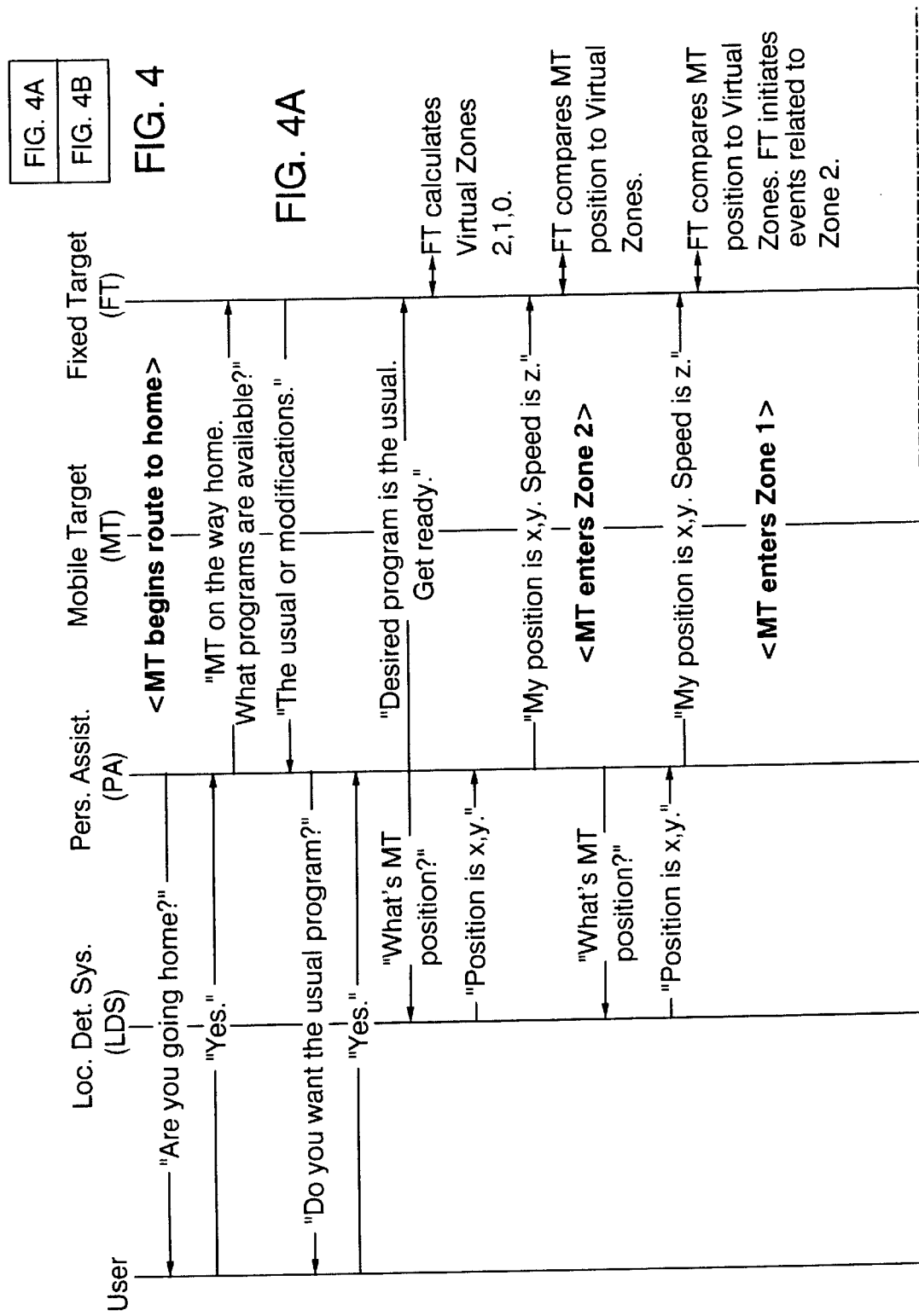

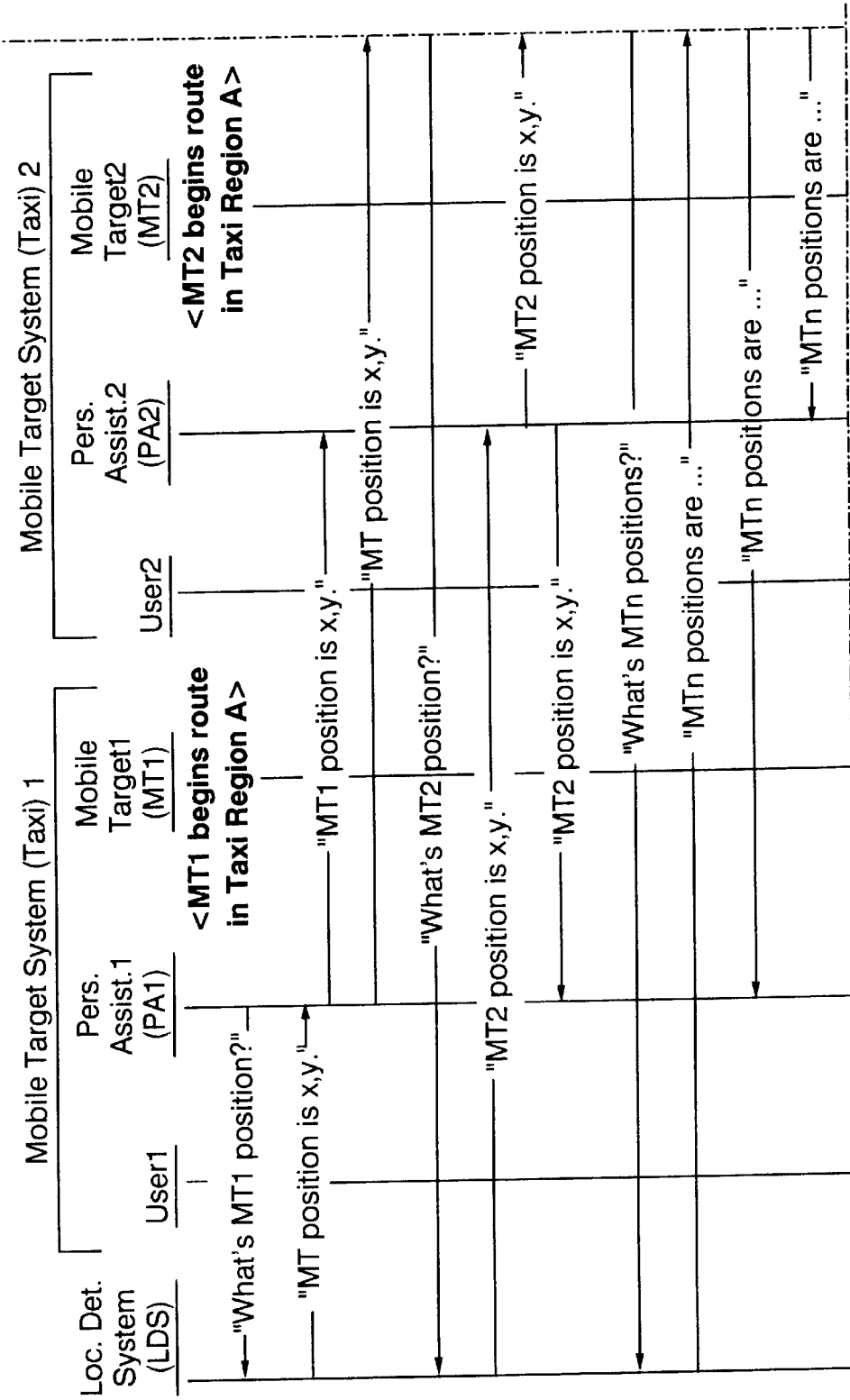

METHOD AND APPARATUS FOR DYNAMIC INFORMATION TRANSFER FROM A MOBILE TARGET TO A FIXED TARGET THAT TRACKS THEIR RELATIVE MOVEMENT AND SYNCHRONIZES DATA BETWEEN THEM

CROSS-REFERENCE TO RELATED APPLICATIONS

This application is related to and claims the benefit of U.S. Provisional Patent Application Ser. No. 60/110,480 filed on Dec. 1, 1998 and entitled "Dynamic Information Transfer System".

FIELD OF THE INVENTION

The present invention relates generally to the transfer of information and more particularly to the dynamic transfer of information among multiple moving and/or fixed targets.

BACKGROUND OF THE INVENTION

There are currently many technologies, devices, and services that contribute to the productivity of mobile people primarily by enabling them to access information and communicate with others. Up until now, there has not existed a system that coordinates information pertaining to time, distance, and motion in order to maximize an individual's schedule or activities. There is an opportunity heretofore unaddressed by current technologies to use information about a person who may be in transit to intelligently manage the transfer of information among multiple other entities. Transferred information is then used to coordinate and initiate events of importance while the person is in transit. Events can be initiated at a place from which the person has departed, at a destination to which the person is approaching, or even in other people's mobile environments.

SUMMARY OF THE INVENTION

A Dynamic Information Transfer (DIT) system according to the present invention enables the use of information associated with a mobile target or information associated with a number of mobile targets for purposes of actively and autonomously transferring information for the benefit of the person associated with the target. A DIT system utilizes intelligent software agents (ISAs) to manage and coordinate network based operations, such as collecting data, transferring data, initiating events or programs, and negotiating with other ISAs in the network. One particular intelligent agent, sometimes referred to as a personal assistant device (PAD), interacts with a user through a user interface and is programmed directly or by autonomous acquisition to perform a variety of tasks on behalf of a user. A user is a person that is associated with a target. A user can move from one target to another such as when the user departs his office and enters his automobile.

A DIT system continually monitors a mobile target's location via a Location Determination System, such as, for instance, the satellite navigation Global Positioning System (GPS) or cellular tower triangulation, and calculates the mobile target's direction and speed based on changes of location over time. A DIT system also monitors the context and nature of the mobile target's activities, such as the networks, applications, services, files, and data types that are in use at each moment. Information about the mobile target's location, direction, speed, and current tasks is transmitted to other mobile targets and/or fixed targets either periodically or at the request of systems associated with the other targets. Thus, a mobile target's location, direction, and speed might be transmitted periodically, and information about its current tasks might be transmitted only when requested by systems associated with the destination target.

In order to determine what types of information need to be transmitted and at what times, targets in a DIT system continually calculate one or more virtual zones. Virtual zones are artificial bounded areas encompassing each target. Virtual zones function as triggering mechanisms when their boundaries are crossed. Crossing into or departing a virtual zone can trigger requests for information, transfers of information, or the initiation of events or programs in other targets. The geometry or dimensions of each virtual zone are based on, among other things, the time required to complete or initiate events or programs at a target in order to synchronize the event or program with the user's arrival, the position, direction, and speed of a target, and the nature of the tasks or activities in which a user associated with a target is engaged. For instance, tasks, events, or programs that require more time to complete are associated with larger virtual zones. Thus, when a larger virtual zone is entered into more time is allotted to perform specified functions associated with entry into that virtual zone.

When a mobile target enters a virtual zone of a second target (either mobile or fixed), the second target will perform the data transfer or program initiation operations that are associated with entry into that virtual zone. The second target may, for instance, initiate an event at its location, transfer information to the first target, or request further information from the first target. When a target system is queried for information, it may, in turn, initiate a swarming operation in a network, where one or more ISAs are dispatched to find, retrieve, and return with requested information.

As a user switches from one target to another such as when leaving work and entering an automobile or arriving home and moving from the automobile into the house, there may be activities in which the user is engaged and must be terminated, but which the user wishes to resume. In these cases, a DIT system would perform a warm transfer of information such that the context and nature of the user's activities will be transferred to the second target and reestablished there. For example, an user may be listening to his PAD as it reads e-mail messages, and upon arriving home, the home system has already started the computer, made any necessary network connections, launched the user's e-mail application, and opened the particular e-mail message the user was reading/listening to when the process was terminated in the first (mobile) target.

According to a first embodiment of the invention there is a system for dynamically transferring information between at least two targets, one of which is mobile. A processing device is associated with each target and communicates with a location determination system. In addition, the processing device is capable of performing data transfers with all other targets. Each processing device determines virtual zones that encompass its respective target. Moreover, each processing device contains data pertaining to events to be initiated upon entry into or departure from a virtual zone. Events are triggered when one target enters a virtual zone of another target as determined by the location determination system.

According to a second embodiment of the invention there is a method of dynamically transferring information between a mobile target and a fixed target. A location determination system determines the position of the mobile target in relation to the fixed target. A plurality of virtual zones encompassing the fixed target are determined based on specified events that are to occur at the fixed target. The mobile target's current position is communicated to the fixed target on a periodic basis and data transfers are automatically triggered when the mobile target crosses into a virtual zone of the fixed target. The data transfers initiate the events that are to occur.

According to a third embodiment of the invention there is a computer program product for dynamically transferring information between a mobile target and a fixed target. The computer program product has a medium with a computer program embodied thereon. Computer program code determines the position of the mobile target in relation to the fixed target via communication with a location determination system. Computer program code further determines a plurality of virtual zones encompassing the fixed target. The mobile target's current position is communicated to the fixed target on a periodic basis and computer program code automatically triggers a data transfer when the mobile target crosses into a virtual zone of the fixed target.

According to a fourth embodiment of the invention there is a method of dynamically transferring information among a plurality of mobile targets. The positions of each mobile target are determined using a location determination system. A plurality of virtual zones encompassing each mobile target are also determined. The current position of each mobile target is communicated to the other mobile targets and events are automatically triggered when one mobile target crosses into a virtual zone of another mobile target.

According to a fifth embodiment of the invention there is a method for performing a warm transfer of data between first and second targets. Data, and the context of its use, that is currently being used within the first target is saved and communicated to the second target. The second target lamches applications necessary to load the saved data such that its use may be resumed in the same context in the second target and at the same point it was last used in the first target.

Other aspects and features of the present invention will become apparent to those ordinarily skilled in the art upon review of the following description of specific embodiments of the invention in conjunction with the accompanying figures.

BRIEF DESCRIPTION OF THE FIGURES

FIG. 2 illustrates processes that generally comprise a Dynamic Information Transfer (DIT) system of the present invention.

FIG. 3 illustrates a system diagram for a scenario in which a mobile target approaches a fixed target.

FIGS. 4A–4B illustrate an event model using an intelligent home as a fixed target.

FIGS. 6A–6D illustrate an event model using a taxi company as a multiple mobile target system.

DETAILED DISCLOSURE OF THE EMBODIMENTS

Figure 1:
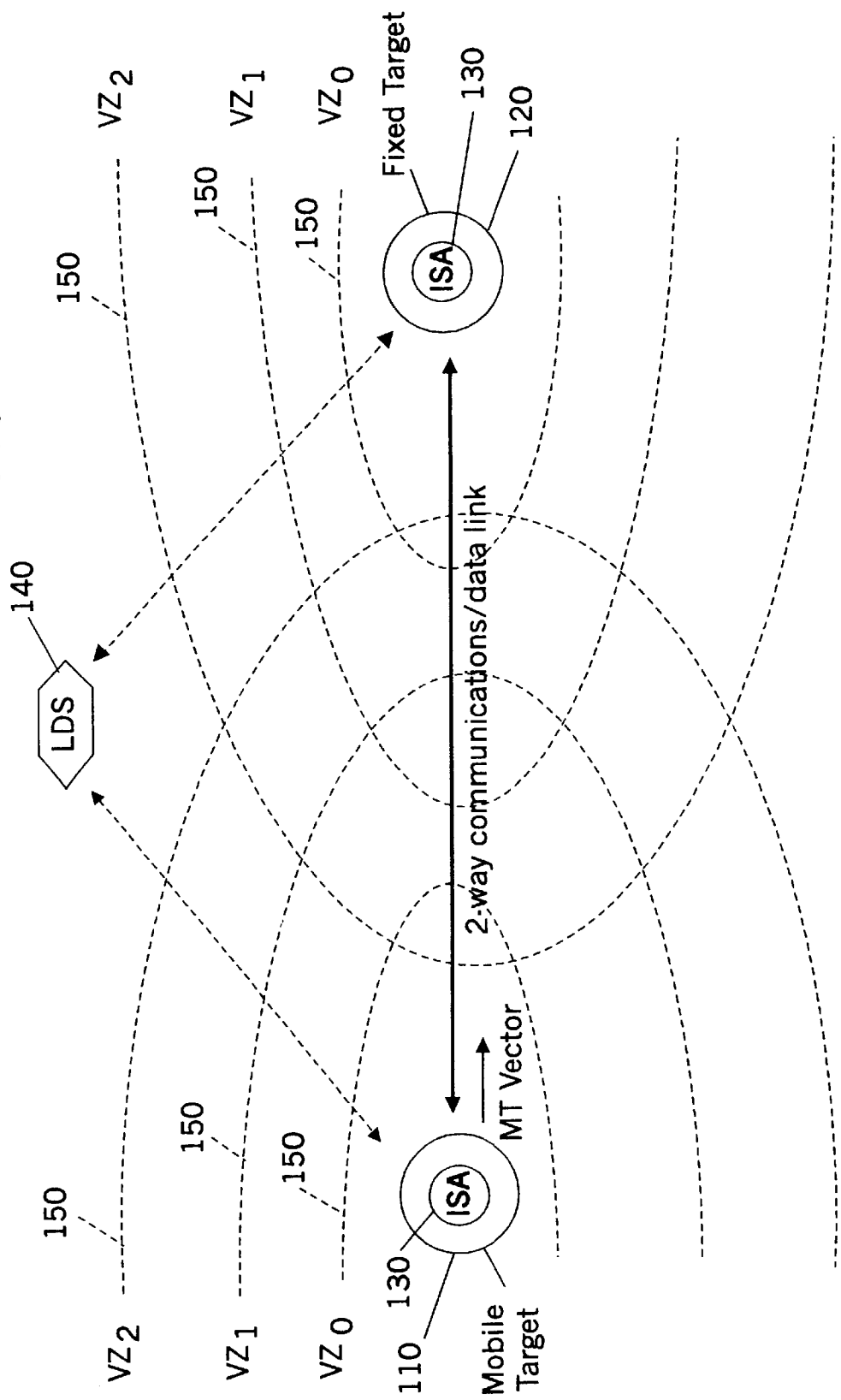
FIG. 1 illustrates elements that generally comprise a Dynamic Information Transfer (DIT) system of the present invention.

FIG. 1 illustrates elements of a Dynamic Information Transfer (DIT) system. There are at least two targets 110, 120, one of which is a mobile target 110, and among which information can be transferred. There are two (2) targets illustrated in FIG. 1. However, more targets, either fixed or mobile, may be incorporated into a DIT system without departing from the spirit or scope of the present invention.

A mobile target 110 generally comprises a moving person, object or vehicle that approaches, or departs from, another mobile target 110 or a fixed target 120. A mobile target 110 is associated with communication capabilities that can send and receive data, data storage capabilities that can store programs, files, profiles, and other electronic information, and processing capabilities that can process information, run programs, initiate events, and conduct other electronic activities. In addition, a mobile target 110 is further associated with means that enable user to interact with the programs associated with mobile target 110. A mobile target 110 could be a person in an automobile, a person walking or riding a bicycle, or a business traveler in a hotel or airplane. The communication capabilities referred to above generally comprise a device that car transit, receive, display, and process data and can be any that are well known in the art such as, for instance, 2-way RF wireless links used in cellular and paging technologies. The communications device also has a receiver linked to a Location Determination System (LDS) 140.

A fixed target 120 may comprise a stationary object or facility to which a mobile target approaches, or from which a mobile target 110 departs, and with which mobile target(s) exchange data. A fixed target 120 is associated with communication capabilities that can send and receive data to and from other targets, either fixed or mobile, data storage capabilities that enable it to store programs, files, profiles, and other electronic information, and processing capabilities that enable it to process information, run programs, initiate events, and conduct other electronic activities. A fixed target could be, but is not limited to, a home, an apartment complex, a small or large business facility, a public facility, or any other type of stationary object or facility.

An intelligent software agent (ISA) system 130 is associated with the communication device that is associated with each target. An ISA 130 is generally comprised of a software program that has sensing, processing, interpretation, and decision making capabilities. An ISA also has some degree of autonomy in its behavior and in its ability to communicate and negotiate with other ISAs. ISAs 130 have attributes that can be characterized along five (5) dimensions. The first is 'intelligence' meaning the capability to sense information, perceive meaningful relationships in information, interpret information for predictive purposes, process information for decision-making purposes, and acquire new behaviors as a result of interaction with information. The second dimension is 'autonomy' meaning the empowerment delegated to agents to act, either proactively or reactively, on behalf of people (users). The third dimension is 'presence' meaning the degree to which ISAs interact with users. This can occur in a vivid way (where the user interacts directly with the agent) or a transparent way (where the agent may not be noticed at all or only by selected system operators). The fourth is a 'metaphorical' dimension meaning the analogy or likeness used in rendering an ISA to a user. The fifth dimension is 'anthropomorphism' meaning the degree to which the rendering of an agent incorporates human characteristics. Of these dimensions, intelligence and autonomy are the two most significant, whereas the other dimensions support the primary attributes of intelligence and autonomy.

An ISA system 130 runs on a processing device, sometimes referred to as a personal assistant device (PAD). A PAD contains a user interface comprised of means by which a user interacts with an ISA system. The user interface controls how the individual inputs information into the system and how the system displays information to the individual. The user interface can be vocal-auditory (i.e., a speech recognition interface), manual-visual (e.g., a keyboard/mouse/pen and display monitor interface), some combination of these, or some other modality altogether. A PAD also possesses the communications equipment needed to send and receive data to other targets as well as a receiver linked to an LDS 140 for determining location data on a real-time basis.

A Location Determination System (LDS) 140 is utilized to determine a mobile target 110's geographical position and the mobile target 110's direction and speed of travel. Example location determination systems 140 include, but are not limited to, the satellite navigation Global Positioning System (GPS) or cellular tower triangulation. An LDS 140 periodically determines the location of a target and transits the location data to the target's ISA 130. The target's ISA 130 then transmits its current location to other targets in a DIT system for the purpose of determining whether any virtual zones 150 have been crossed. If a first target determines that the position of another target places it within one of its virtual zones 150, then the first target will initiate contact with the other target for the purpose of transferring data needed to perform any activities associated with the virtual zone 150 that has been entered.

An LDS 140 is used in conjunction with virtual zones 150 to trigger data transfers among DIT system targets for the purpose of initiating or terminating events, or programs at other DIT system targets. Virtual zones 150 are essentially artificial bounded areas encompassing each DIT system target. Virtual zones 150 are associated with specified types of data transfers to be conducted between or among targets. A virtual zone 150 is defined and calculated according to a temporal duration, and is related to the time required to conduct operations at a target that are dependent on the information to be transferred from another target. The geometry, or dimensions, of a virtual zone 150 can be calculated as a function of the absolute distance of a mobile target 110 from another target, with consideration given to the speed and direction of movement of the mobile target 110 towards the other target. Virtual zones 150 are elastic, 3-dimensional, and can be adjusted in space per user or ISA 130 requirements. In addition, each mobile 110 or fixed 120 target can maintain multiple, simultaneous systems of virtual zones 150 for different concurrent purposes.

A User Profile is created and maintained either manually by the user or automatically by the ISA/PAD 130 associated with a user. A user profile comprises a set of preferences for programs or applications, as well as desired ISA/PAD 130 behavior under various conditions. These preferences can be defined by an individual user or acquired autonomously by the ISA/PAD 130.

In order to transfer data, the communications devices associated with the sending and receiving targets must establish a communications link. Docking refers to the establishment of a communications link between devices for the purpose of exchanging data. Docking typically, but not necessarily, refers to a wired connection between two stationary devices or a stationary device and a network. Mobile docking refers to the establishment of a data communications link between a fixed or stationary system and a mobile system or between one mobile system and another mobile system for the purpose of exchanging data. This is typically a wireless link such as, but not limited to, 2-way RF communications.

The basic processes of a DIT system are illustrated in FIG. 2. These processes are not necessarily in serial order as many could run in parallel or repetitively depending on the task at hand. A mobile user (i.e., a user in a mobile target such as an automobile) interacts with his PAD to get information, input information, or provide instructions 210 to an associated ISA. These interactions might include verifying the intended route or specifying types of information transfers to be monitored and performed during the route. The types of information transfer might include initiating desired programs at the other target (e.g., at the destination or in another mobile target), gathering information during the route (for the user directly, or as required to run programs in the mobile target), or transmitting information during the route (to other users directly, to other agents systems, or as required to run programs in other targets). The PAD queries 220 its user profile to determine any existing preferences or programs regarding the user, or instructions or parameters regarding its own operation. Each ISA dynamically calculates 230 one or more virtual zones around its target's position. Each virtual zone is associated with an identified instance or set of instances of data gathering, data transmission, program or event initiation, or some other action previously defined. The ISA associated with each target continually queries the LDS for coordinates, calculates the position, direction, and speed of its associated target, and transmits 240 this information to other ISAs in the system. Each target's ISA continually receives information about the position, direction, and speed of other DIT system targets, and compares this information with its own virtual zone definitions. When a mobile target enters (or leaves) a defined virtual zone of another target, each target's ISA will perform 250 all actions associated with the entering (or leaving) that particular virtual zone. In some cases, when the nature of actions is sensitive or secure, the user will be asked for confirmation (via interaction with his PAD) for the pending action.

Sometimes the user will be engaged midpoint in some activity and must move from one target to another target (e.g., arriving at home—a fixed target—and going inside), thereby terminating the activity prior to completion. In this situation the PAD captures all necessary context information 260 for the activity and transmits 270 this information to the destination target's ISA such that the activity can be reestablished in the new target at the point in the activity where it had been terminated. This is referred to as a warm transfer, since it maintains and reestablishes the context of an activity. A warm transfer comprises the transfer of context data from a first target to a second target where the context data is associated with a user activity that has been terminated prior to completion. The data transfer allows the second target to resume the activity at the point it was terminated in the first target. The context of an activity includes, but is not limited to, the type of network connection being used, the type of device was being used, the program or application being used, the file, document, message, or other item being viewed or listened to by the program or application. The received context data is used in the second target to reestablish connections, launch devices or applications, and open files, messages or other items as required for the user to resume the activity at the point it was left off. Examples of activities include, but are not limited to, composing or listening to an e-mail message, reviewing a document, reviewing a calendar, reviewing appointments, reviewing messages, listening to a song or CD; watching a movie, conducting a commercial or financial transaction, or talking on the phone.

With respect to target configuration, a DIT system can be configured for a single mobile target—single or multiple fixed target system, e.g., a user and an intelligent home that manages multiple home systems and a computer, based on the user's location and arrival time at home. Or, a DIT system can be configured for a multiple mobile target—single or multiple fixed target system, e.g., a family comprised of several members with PADs, and a system at home that manages the family schedule and controls the household heating and lighting. Or, a DIT system can be configured for a single mobile target—single mobile target system as in two automobiles passing on the highway and participating in a shared electronic game. Or, a DIT system can be configured for a multiple mobile target system, e.g., a public system to facilitate traffic flow.

With respect to the direction of mobile target movement, 'approach' occurs when a mobile target approaches a fixed target or another mobile target as a destination, possibly with the user's intent of moving into that other target. 'Departure' occurs when a mobile target departs from a fixed target or another mobile target. 'Passing by' occurs when a mobile target passes by another mobile target or by a virtual zone. 'Moving with' occurs when two mobile targets move and remain within each other's virtual zones.

With respect to an application area, a residential area can be, for instance, a smart home monitoring a broad range of data types, such as personal information, home access information, environmental information, landscaping information, appliance information, entity presence, parking information, MS Office type of data, calendar and scheduling information, financial information, telecommunications and messaging information, or network identity information. The smart home monitors these and other data types, as well as the user's location and movement, and initiates programs, lights, heat, etc. based on owner's location and time of arrival.

An enterprise area can be, for instance, a DIT system to facilitate parking at an airport. The system can determine more than whether lots are open or full, such as determining the best open spot based on the needs of the driver at that time, reserving that spot, and directing the driver to the spot.

A public area, for instance, can be a DIT system to facilitate traffic flow efficiency, traffic light behavior, accident avoidance, emergency management, as well as the fluid exchange of general traffic, food, service station, hotel, or other useful information between and among vehicles in an intersection of virtual zones (e.g., mobile community, communication, coordination, cooperation, and even games and movies).

With respect to data types, there are time sensitive and time insensitive data types. Examples of time-sensitive data types (i.e., those having transmission timing factors critical to quality of information and/or sustained utilization of bandwidth) include, but are not limited to, entertainment information, e.g., continuous sound, continuous video, interactive games and voice data, e.g., phone calls, including Voice over the Internet (VoIP). Examples of time-insensitive data types (i.e., those having transmission timing factors not critical to quality of information and/or transient utilization of bandwidth) include, but are not limited to personal information (such as name, phone number), facility access information (such as gates, garage doors, doors, security systems), environmental information (such as lighting, heating & AC), landscaping information (such as lighting, sprinkling system settings), appliance information (such as kitchen, home office, work equipment), entity presence (such as number of persons or other significant animated objects at a target), parking information (such as lot assignments, privileges, preferences), MS Office data (such as applications, files), calendar & scheduling information (such as personal and work calendars, planned activities), financial information (such as institutions, accounts, codes), telecommunications and messaging information (such as services, message systems, access numbers and codes), and network identity information (such as network access numbers and codes, passwords).

A DIT system can be implemented to provide dynamic information transfer in a variety of contexts and configurations. Several illustrations of DIT systems are presented below. The following systems by no means encompass the full scope of the invention. Rather, the DIT systems are presented for illustrative purposes only. One of ordinary skill in the art can readily adapt one or more of the following DIT systems to create other DIT systems. As such the following systems are not to be considered as limiting the present invention.

The systems below depict somewhat simplistic examples of DIT functionality. In actuality, virtual zones are elastic, three-dimensional, and can be dynamically adjusted in space per user or ISA requirements. In addition, each fixed or mobile target can maintain multiple, simultaneous sets of virtual zones for different concurrent purposes.

FIG. 3 illustrates a system diagram for a scenario in which a user approached a fixed target. A mobile target 310 begins a route to a fixed target 320 that is declared by the user or inferred from a set of possible targets by the user's PAD 330, Mobile target 310 can be an automobile, airplane, hiker, jogger, etc. while fixed target 320 can be a home, office, etc. PAD 330 queries the, user to confirm that the user is en route to fixed target 320. Upon confirmation, PAD 330 queries fixed target 320 to obtain available programs or events. PAD 330 then queries the user to confirm desired programs or events. The user confirms desired programs or events or makes changes to desired programs or events. PAD 330 then queries Location Determination System (LDS) 340 to obtain the mobile target 310's current position. PAD 330 instructs fixed target 320 to prepare to initiate confirmed programs or events and provides the fixed target with the current position and speed of the mobile target. Fixed at 320 calculates the required virtual zones 350 based on the confirmed set of programs or events and the current position and speed of mobile target 310. Fixed target 320 compares the reported position of mobile target 310 to the location of the defined virtual zones 350, and initiates any programs or events if the user is already within one or more of the defined virtual zones 350. Mobile target 310 continues to approach fixed target 320. PAD 330 periodically queries Location Determination System (LDS) 340 to obtain mobile target 310 position data, and transmits position data to fixed target 320. Fixed target 320 continually compares the reported position of mobile target 310 to the location of the defined virtual zones 350, and initiates any programs or events if the user has entered one or more of the defined virtual zones 350. For certain programs or events (e.g., security or financial types of events), fixed target 320 may query PAD 330 for confirmation prior to initiating the program or event. In such cases, PAD 330 queries the user for confirmation; the user confirms the action; PAD 330 informs fixed target 320 of the confirmation; and fixed target 320 initiates the program or event at the appropriate time. Mobile target 310 arrives at fixed target 320. All desired prow or events have been initiated. Any tasks in which the user is engaged are terminated in mobile target 310. The status of the tasks, any information involved in the task and required for resuming the tasks within the fixed target, and information about programs being used to perform the tasks, are transmitted to the fixed target. The fixed target may initiate those programs and resume the tasks autonomously or as requested by the user upon entering the fixed target.

Figure 4B:
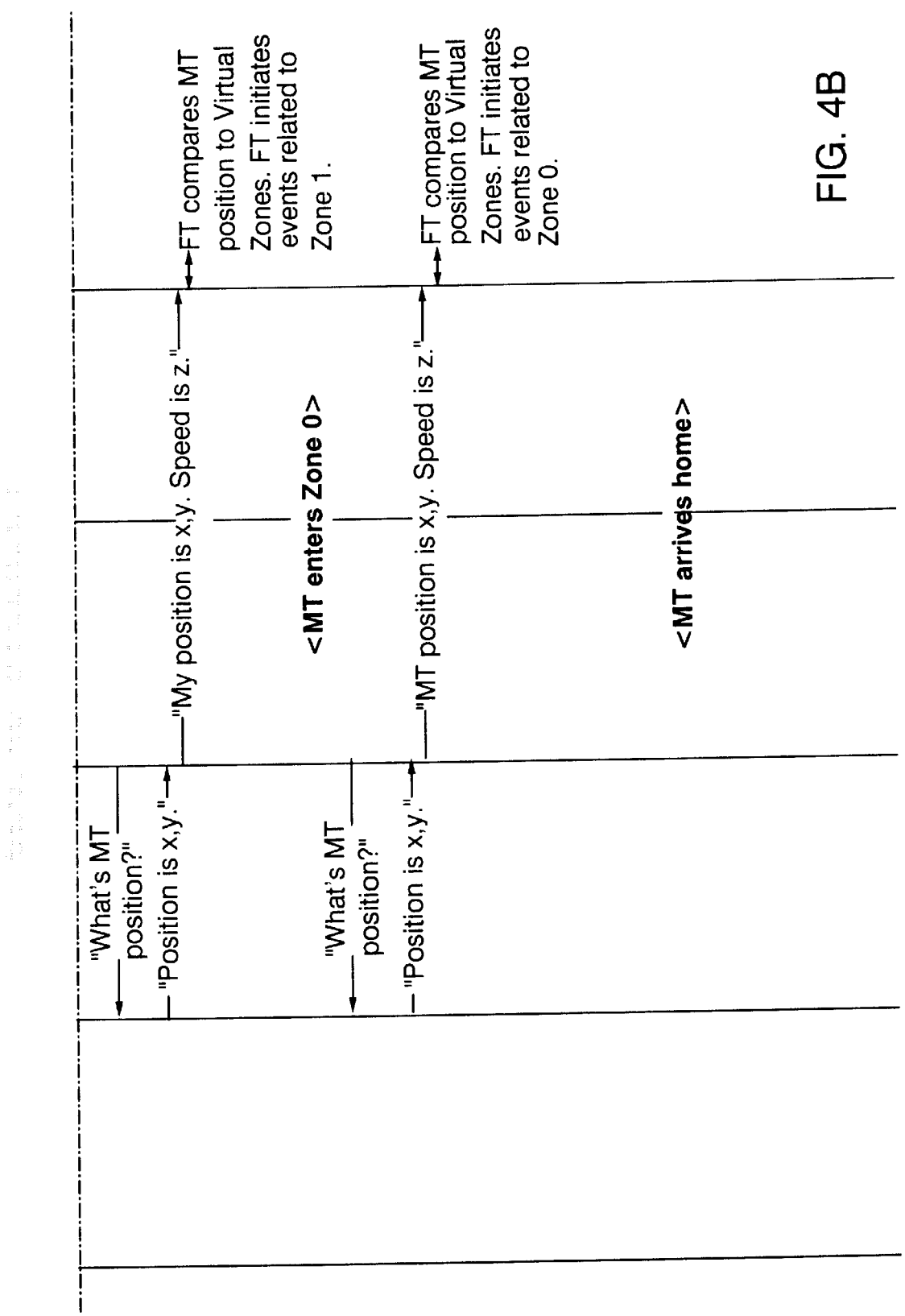

FIGS. 4A–4B illustrate an event model scenario using an intelligent home as a fixed target. The system diagram of FIG. 3 provides the physical environment for the scenario of FIGS. 4–4B. FIGS. 4–4B show the relationship and data flow among a user, a location determination system (LDS), a personal assistant device (PAD), a mobile target (MT), and a fixed target (FT). In this scenario, the fixed target is an intelligent home, e.g., a home that possesses communications and computing ability to run many household functions and appliances.

As the mobile target starts traveling a route towards home, the scenario begins with the user's PAD querying the user whether he is going home. In this example the user responds affirmatively and the PAD then initiates contact, performs a mobile docking operation, with the fixed target (FT). The PAD informs the fixed target that the user is enroute home and inquires as to what programs are available. The fixed target provides the usual programs (as previously determined and set up by the user) and an option for modifications. The PAD asks the user if he wishes to run the usual programs. The user responds affirmatively. At this point the PAD informs the fixed target that the user has opted for the usual programs and also queries the LDS as to the mobile target's current position. The user and his PAD are in the mobile target as it moves towards the fixed target. Once the fixed target knows that the user has selected the usual programs, it can calculate the necessary virtual zones that will serve as triggering mechanisms for the selected programs. In this example, three (3) virtual zones are calculated. Concurrently, the PAD is communicating with the LDS receiving mobile target position and speed updates which are communicated to the fixed target. The fixed target periodically compares the mobile target's current position to the previously calculated virtual zone boundaries in order to determine if the mobile target has entered or exited a particular virtual zone, and, if so, what action to take. The frequency of the position updates can be variable. Once the mobile target crosses the boundary into virtual zone 2 (see, FIG. 3) the fixed target automatically initiates any events related to virtual zone 2 such as, for instance, turning up the heat in the house and starting the coffee maker. As the mobile target continues homeward, it eventually crosses the boundary into virtual zone 1. This information is relayed to the fixed target via the PAD during the periodic position updates. Once the boundaries of virtual zone 1 are crossed, the fixed target automatically initiates events related to virtual zone 1 such as, for instance, turning on kitchen lights and turning on outdoor lights. As the mobile target draws nearer to home and crosses the boundary for virtual zone 0, the fixed target automatically initiates events related to virtual zone 1 such as, for instance, opening the garage door, disabling the security system, turning on the stereo and tuning it to the same station currently tuned in the mobile target, and launches the user's home computer e-mail application and opens any messages currently open in the mobile target at the point last processed (warm transfer). The PAD utilizes a 2-way wireless communications link with the fixed target to send and receive messages and data. Moreover, the PAD is also similarly communicable with the LDS system.

Figure 5:
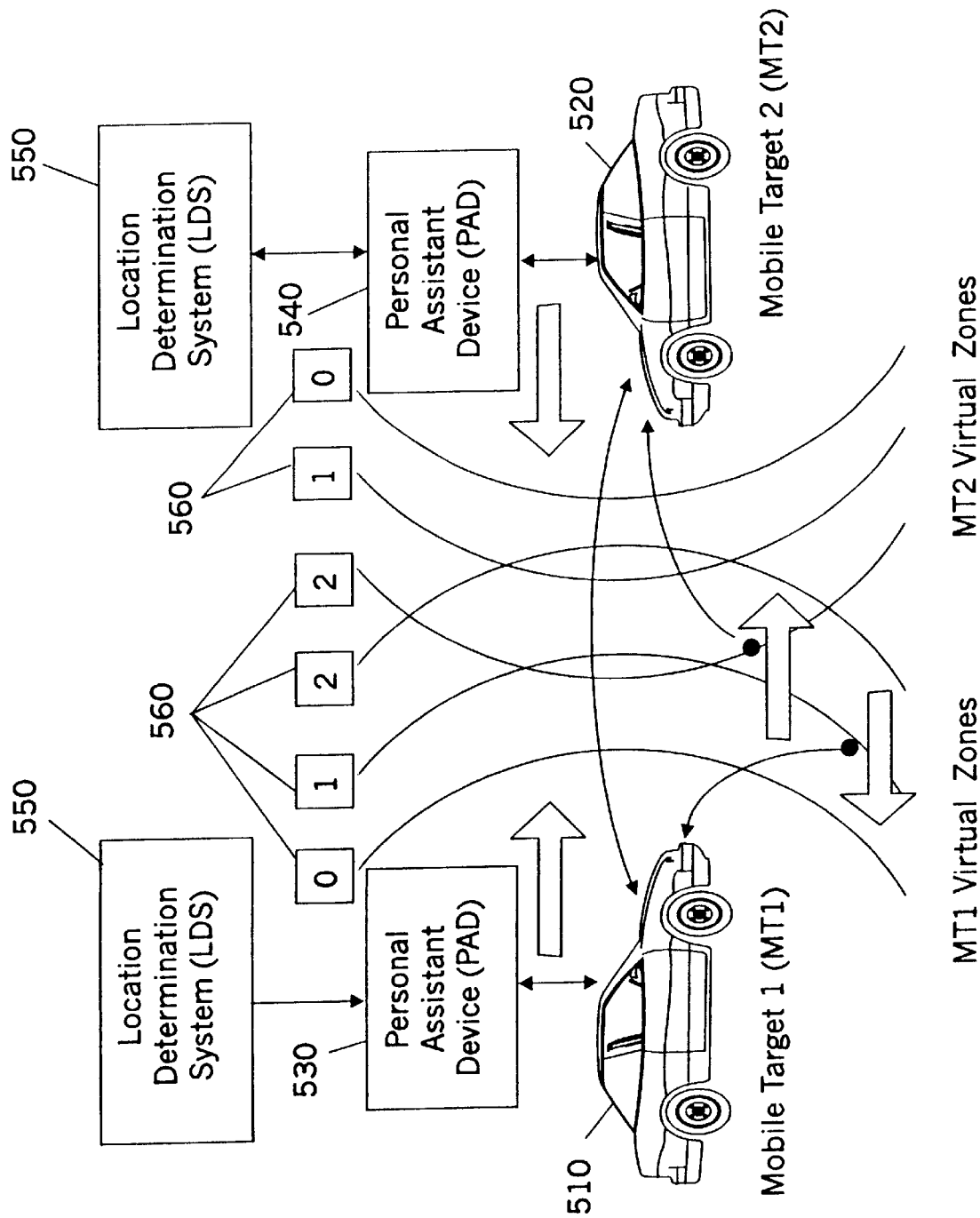
FIG. 5 illustrates a system diagram for a scenario in which a mobile target approaches another mobile target.

FIG. 5 illustrates a system diagram for a scenario in which a mobile target approaches another mobile o target. Mobile targets (MT1) 510 and (MT2) 520 initiate their respective routes. The PADs 530, 540 of each target 510, 520 determine the target's route either by querying the user or inferring, from a set of possible routes and programs as defined in the User Profile, the programs to run on the route, and the conditions under which the programs will be initiated. PADs 530, 540 begin a periodic querying of Location Determination System (LDS) 550 to obtain the position of the targets 510, 520. This information is used to calculate vehicular speed and direction, and all of this information (position, speed direction) is periodically transmitted out to other mobile targets (not shown) who may be listening. Each target receives periodic updates of the positions, speed and direction of other targets and compares this information to its own defined virtual zones 560. When MT1 510 enters a defined virtual zone 560 of MT2 520, the programs associated with that virtual zone 560 are initiated in MT2 520. Those programs may be, for instance, a data swarming operation in the network, a data transfer to MT1 510, a data transfer to another target or system, a request for data from MT1 510, or the initiating of a program, application or other event in MT2 520. When MT2 520 enters a defined virtual zone 560 of MT1 510, the programs associated wit that virtual zone 560 are initiated in MT1 510. These programs may be, for instance, a data swarming operation, a data transfer to MT2 520, a data transfer to another target or system, a request for data from MT2 520, or the initiating of a program, application or other event in MT1 510. As MT1 510 and MT2 520 continue to travel and remain within each other's defined virtual zones 560, there is a continuous transfer of information or initiation of programs as defined by their respective virtual zones 560. As MT1 510 and MT2 520 leave each other's virtual zones 560, there is a corresponding termination of programs as defined by each virtual zone 560, unless there is some input from one or both users to continue the programs or data transfer operations. This amounts to a real-time, elastic adjustment of the virtual zone definitions of one both mobile targets). Ultimately, MT1 510 and MT2 520 completely leave each other's defined virtual zones 560, and all program s and data sharing activities are terminated.

Figure 6B:
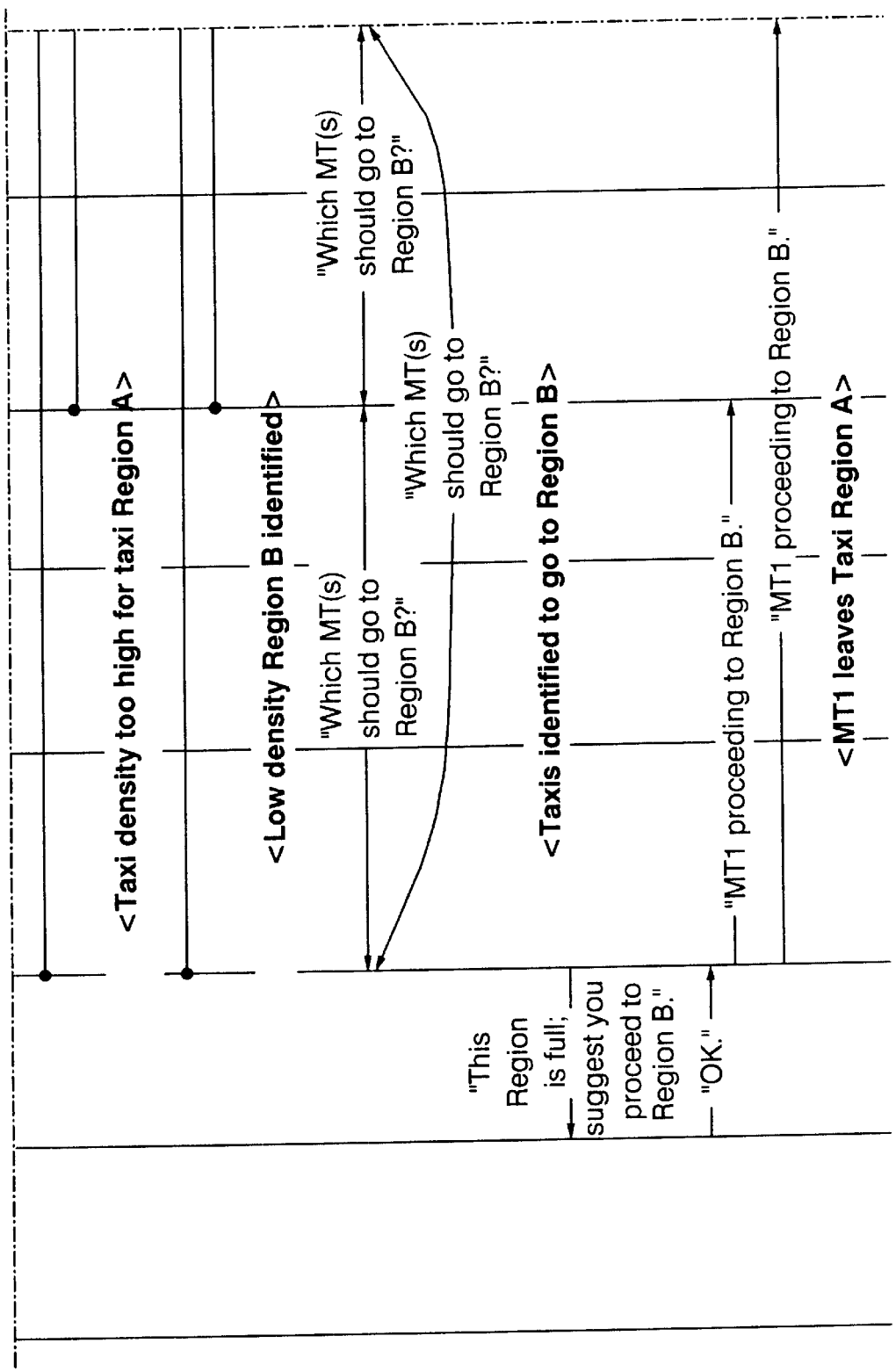
Figure 6C:
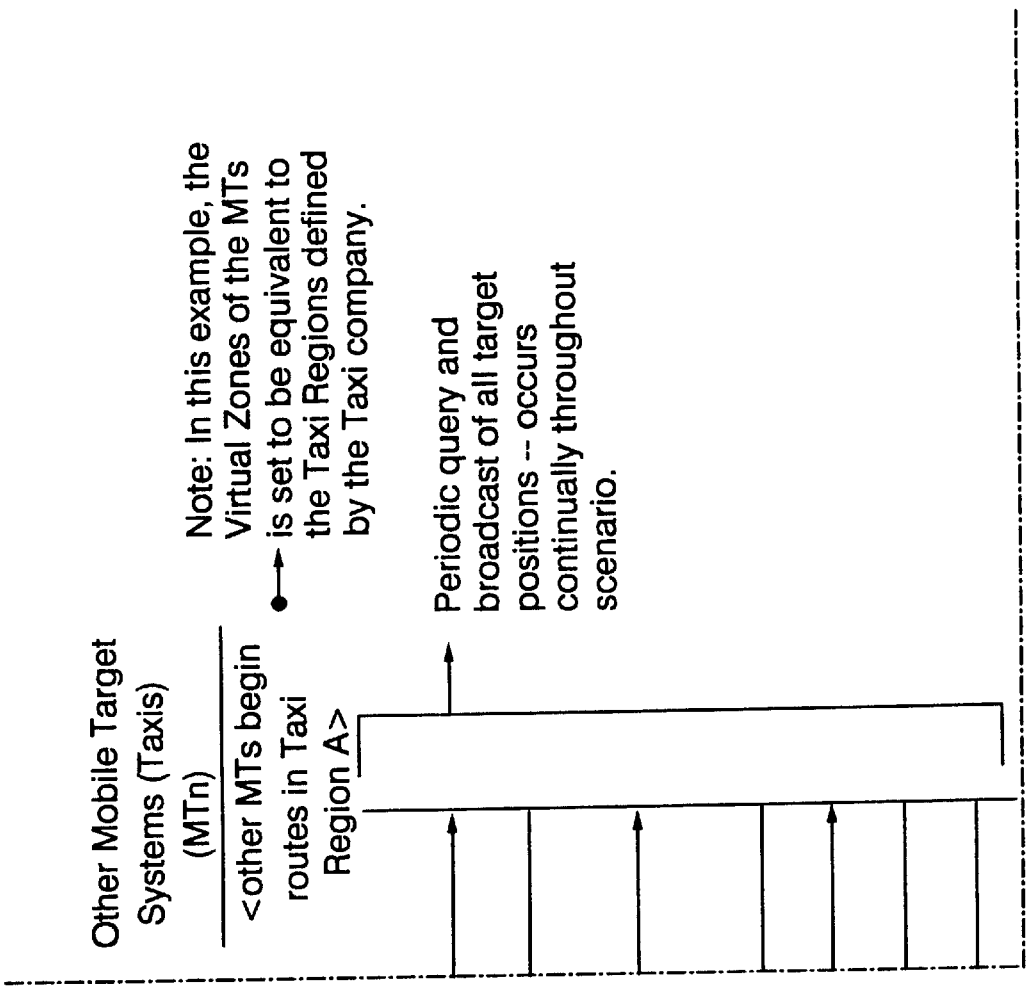
Figure 6D:
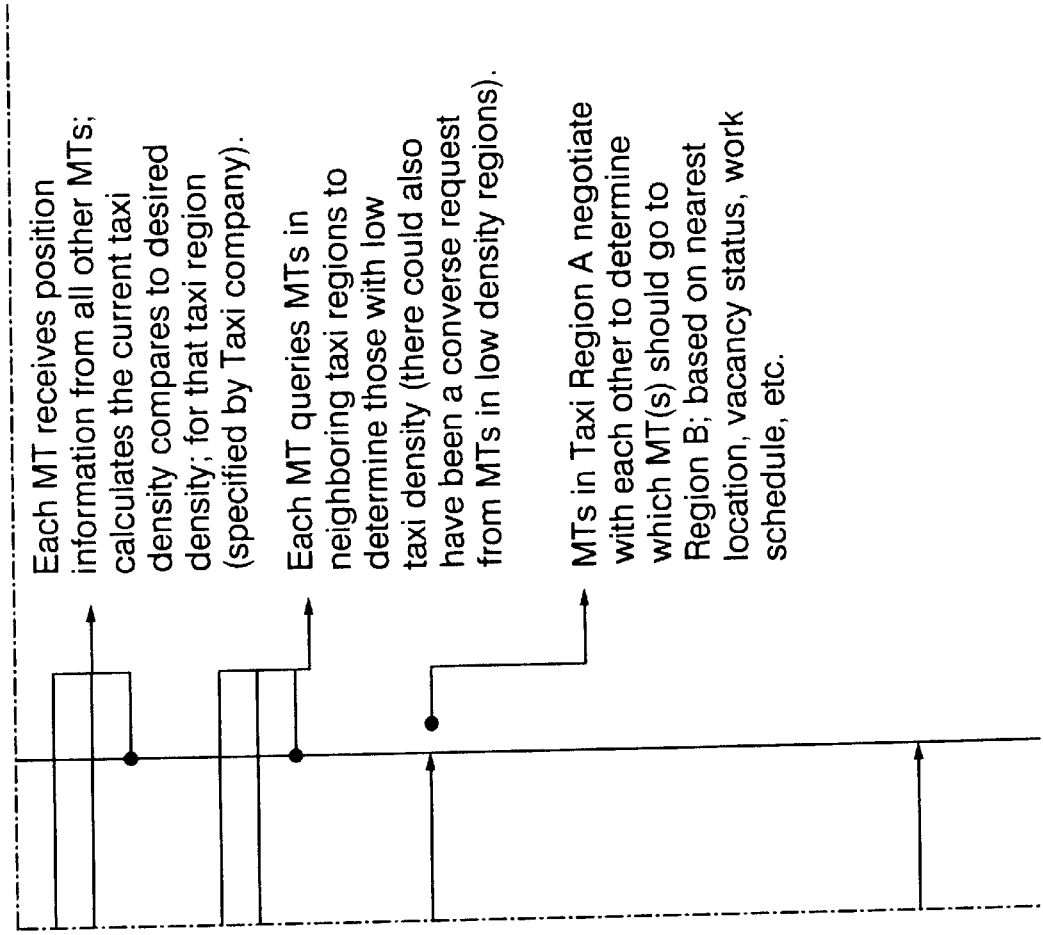

FIG. 6 illustrates an event model using a taxi company as a multiple mobile target system. The system diagram of FIG. 5 provides the physical environment for the scenario of FIG. 6. FIG. 6 shows the relationship and data flow among a location determination system (LDS), a first user (User1) and his personal assistant device (PAD1), the mobile target (MT1) he is traveling in, a second user (User2) and his personal assistant device (PAD2), the mobile target (MT2) he is traveling in, and other mobile target systems (MTn). In this scenario, a mobile target system is comprised of a taxicab as the mobile target, the operator or driver as user, and the user's PAD. The mobile target systems are under the aegis of a taxi company. Moreover, the virtual zones of each mobile target is set to be equivalent to specified geographic regions as defined by the taxi company. For purposes of this scenario there are a plurality of mobile targets (taxicabs), MT1 . . . MTn, that patrol two regions (regions A and B) as designated by the taxi company.

For the taxi company to operate at peak efficiency it should know the whereabouts of each taxicab at any given moment. This information can then be plotted to determine areas of high density and low density. If an area is too densely populated with taxicabs then certain taxicabs can be strategically re-directed to areas of low density. The ultimate goal is to have an even geographic distribution of taxicabs in order to maximize each taxicab's chance of obtaining a fare.

Each mobile target system is engaged in a frequent periodic exchange of information with all other mobile target systems that comprise the overall DIT system. The information periodically being exchanged is the location of each mobile target in the overall system. Thus, each driver's PAD is frequently updated with all the other mobile targets' positions. This information can be plotted against the pre-defined regions set by the taxi company. If a mobile target is in a too densely populated region, contact is initiated with other mobile target systems in the densely populated region and negotiations ensue over which mobile target system should vacate the dense region and proceed to a less dense region. Negotiation refers to interaction with other ISAs in the system for transaction or information transfer operations. The rules of negotiation may be pre-programmed and based on factors such as, for instance, whether a taxicab is currently carrying a fare, the proximity of a taxicab to the less dense region, or the time left in a taxicab's shift. The negotiations may be manual as well such as verbal communications among drivers.

It is to be understood that the present invention illustrated herein is readily implementable by those of ordinary skill in the art as a computer program product having a medium with a computer program embodied thereon. The computer program product is capable of being loaded and executed on the appropriate computer processing device(s) in order to carry out the method or process steps described. Appropriate computer program code in combination with hardware implements many of the elements of the present invention. This computer code is often stored on storage media. This media can be a diskette, hard disk, CD-ROM, or tape. The media can also be a memory storage device or collection of memory storage devices such as read-only memory (ROM) or random access memory (RAM). Additionally, the computer program code can be transferred to the appropriate hardware over some type of data network.

In the following claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A system for dynamically transferring information among targets operated by a single user, at least one of said targets being mobile, said system comprising:
    at least two targets;
    a processing device associated with each target, each of said processing devices being communicable with a location determination system adapted to determine a location and relative movement of each target and each of said processing devices being capable of performing data transfers with the processing devices associated with the other targets,
    wherein
        each of said processing devices determines at least one virtual zone encompassing its respective target, wherein the at least one virtual zone is based at least in part on time required to complete data transfer as affected by said relative movement; and
        each of said processing devices transfers data associated with events to be initiated or terminated, said data transfers triggered upon an entry of one target into a virtual zone of another target as determined by said location determination system, such that the user can transition information relating to an activity from one target to a second target such that a warm transfer of data is achieved when said mobile target arrives at said fixed target, said warm transfer of data comprising:
            saving data that is currently in use within said mobile target;
            saving data associated with a context of an activity that is currently in use within said mobile target;
            communicating said saved data to said fixed target; and
            launching, in said fixed target, applications necessary to load said saved data such that its use can be resumed upon entering said fixed target in the same context and at the same point it was last used in said mobile target.

2. The system of claim 1 in which said data transfers are also triggered upon a departure of one target from a virtual zone of another target as determined by said location determination system.

3. The system of claim 1 wherein said location determination system is adapted to determine direction and speed of movement as part of determining relative movement.

4. A system for dynamically transferring information among targets operated by a single user, at least one of said targets being mobile, said system comprising:
    at least two targets;
    a processing device, associated with each target, each of said processing devices being communicable with a location determination system and capable of performing data transfers with the processing devices associated with the other targets,
    wherein
        each of said processing devices determines at least one virtual zone encompassing its respective target; and
        each of said processing devices transfers data associated with events to be initiated or terminated, said data transfers triggered upon an entry of one target into a virtual zone of another target as determined by said location determination system, such that a warm transfer of data is achieved when said mobile target arrives at said fixed target, said warm transfer of data comprising:
            saving data that is currently in use within said mobile target;
            saving data associated with a context of an activity that is currently in use within said mobile target;
            communicating said saved data to said fixed target; and
            launching, in said fixed target, applications necessary to load said saved data such that its use can be resumed upon entering said fixed target in the same context and at the same point it was last used in said mobile target; and
        in which a geometry of a virtual zone is determined based on a temporal duration of an event that is to be triggered upon the entry of one target into the virtual zone of another target.

5. A method of dynamically transferring data between a mobile target and a fixed target comprising:
    determining a position of the mobile target associated with the user in relation to said fixed target using a location determination system adapted to determine a location and relative movement between the fixed target and the mobile target;

determining at least one virtual zone encompassing said fixed target associated with the user, said virtual zone based at least in part on time required to complete or initiate data transfers as affected by said relative movement;

communicating a current position of said mobile target to said fixed target on a periodic basis;

automatically transferring data between said mobile target and said fixed target when said mobile target enters into a virtual zone of said fixed target; and wherein said data transfer triggers the launching of at least one executable program at said fixed target using data from said mobile target, said data in use by an executable program on said mobile target prior to said transfer such that the user can use first the mobile target and then the fixed target to act on the data with the executable programs;

and further comprising a warm transfer of data when said mobile target arrives at said fixed target, said warm transfer of data comprising:

saving data that is currently in use within said mobile target;

saving data associated with a context of an activity that is currently in se within said mobile target;

communicating said saved data to said fixed target; and launching, in said fixed target, applications necessary to load said saved data such that its use can be resumed upon entering said fixed target in the same context and at the same point it was last used in said mobile target.

6. The method of claim 5 wherein determining a position comprises determining a location, direction, and speed of movement using the location determination system.

7. A method of dynamically transferring data between a mobile target and a fixed target comprising:

determining a position of the mobile target associated with the user in relation to said fixed target using a location determination system;

automatically transferring data between said mobile target and said fixed target when said mobile target enters into a virtual zone of said fixed target; and wherein said data transfer triggers the launching of at least one executable program at said fixed target using data from said mobile target, said data in use by an executable program on said mobile target prior to said transfer such that the user can use first the mobile target and then the fixed target to act on the data with the executable programs and further comprising a warm transfer of data when said mobile target arrives at said fixed target, said warm transfer of data comprising:

saving data that is currently in use within said mobile target;

saving data associated with a context of an activity that is currently in use within said mobile target;

communicating said saved data to said fixed target; and launching, in said fixed target, applications necessary to load said saved data such that its use can be resumed upon entering said fixed target in the same context and at the same point it was last used in said mobile target.

8. A system for dynamically transferring information between a mobile target and a fixed target comprising:

means for determining a position of said mobile target associated with a user in relation to said fixed target using a location determination system adapted to determine a location and movement of the mobile target;

means for determining at least one virtual zone encompassing said fixed target associated with the user, said virtual zone based at least in part on time to initiate or complete data transfers as affected by said movement;

means for communicating a current position of said mobile target to said fixed target on a periodic basis;

means for automatically transferring data between said mobile target and said fed target when said mobile target enters into a virtual zone of said fixed target; and wherein said data transfer triggers the launching of at least one executable program at said fixed target using data from said mobile target, said data in use by an executable program on said mobile target prior to said transfer such that the user can transition from said mobile target to said fixed target using the data in the executable programs; and farther comprising means for accomplishing a warm transfer of data when said mobile target reaches said fixed target, said means for accomplishing a warm transfer of data comprising:

means for saving data that is currently in use within said mobile target;

means for saving data associated with a context of an activity that is currently in use within said mobile target;

means for communicating said saved data to said fixed target; and means for launching, in said fixed target, applications necessary to load said saved data such that its use can be resumed upon entering said fixed target in the same context and at the same point it was last used in said mobile target.

9. The system of claim 8 wherein said means for determining a position determines a location, speed, and direction of movement of the mobile target.

10. A system for dynamically transferring information between a mobile target and a fixed target comprising:

means for determining a position of said mobile target associated wit a user in relation to said fixed target using a location determination system adapted to determine a location and movement of the mobile target;

means for automatically transferring data between said mobile target and said fixed target when said mobile target enters into a virtual zone of said fixed target; and wherein said data transfer triggers the launching of at least one executable program at said fixed target using data from said mobile target, said data in use by an executable program on said mobile target prior to said transfer such that the user can transition from said mobile target to said fixed target using the data in the executable programs and further comprising means for accomplishing a warm transfer of data when said mobile target reaches said fixed target, said means for accomplishing comprising:

means for saving data that is currently in use within said mobile target;

means for saving data associated with a context of an activity that is currently in use within said mobile target;

means for communicating said saved data to said fixed target; and means for launching, in said fixed target, applications necessary to load said saved data such that its use can be resumed upon entering said fixed target in the same context and at the same point it was last used in said mobile target.

11. A computer program product for dynamically transferring information between a mobile target and a fixed target, the computer program product baving a medium with a computer program embodied thereon, the computer program product comprising:

computer program code for determining the position of said mobile target associated with a user in relation to said fixed target using a location determination system adapted to determine location and movement of the mobile target;

computer program code for determining at least one virtual zone encompassing said fixed target associated with the user, said virtual zone based at least in part on time to initiate or complete data transfers as affected by said movement;

computer program code for communicating a current position of said mobile target to said fixed target on a periodic basis;

computer program code for automatically transferring data between said mobile target and said fixed target when said mobile target enters into a virtual zone of said fixed target; and wherein said data transfer triggers the launching of at least one executable program at said fixed target using data from said mobile target, said data file in use by an executable program on said mobile target prior to said transfer such that the user can transition between the mobile target to the fixed target using the data in the executable programs, and further comprising:

computer program code for effectuating a warm transfer of data when said mobile target reaches said fixed target, comprising:

computer program code for saving data that is currently in use within said mobile target;

computer program code for saving data associated with a context of an activity that is currently in use with said mobile target;

computer program code for communicating said saved data to said fixed target; and computer program code for launching, in said fixed target, applications necessary to load said saved data such that its use can be resumed upon entering said fixed target in the same context and at the same point it was last used in said mobile target.

12. The computer program product of claim 11 wherein said computer program code for determining the position of said mobile target determines location, speed, and direction of movement of the mobile target.

13. A computer program product for dynamically transferring information between a mobile target and a fixed target, the computer program product having a medium with a computer program embodied thereon, the computer program product comprising:

compute program code for determining the position of said mobile target associated with a user in relation to said fixed target using a location determination system adapted to determine location and movement of the mobile target;

computer program code for automatically initiating a warm transfer of data when said mobile target reaches said fixed target; and said warm transfer of data comprising:

computer program code for saving data that is currently in use within said mobile target;

computer program code for saving data associated with a context of an activity that is currently in use within said mobile target;

computer program code for communicating said saved data to said fixed target; and computer program code for launching, an said fixed target, applications necessary to load said saved data such that its use can be resumed upon entering said fixed target in the same context and at the same point it was last used in said mobile target.

\* \* \* \* \*